3,015,369
REMOVAL OF NITROGEN OXIDES FROM COMBUSTION GASES

James A. Brennan, Merchantville, N.J., assignor to Socony Mobil Oil Company, Inc., a corporation of New York
No Drawing. Filed May 23, 1960, Ser. No. 30,767
5 Claims. (Cl. 183—114.2)

This invention relates to the removal of oxides of nitrogen from combustion gases. More particularly, the present invention is directed to a method for ameliorating atmospheric pollution created by combustion gases and, specifically, exhaust gases from internal combustion engines.

The form of pollution referred to is that which has become especially prevalent in the coastal region of southern California, where automotive traffic is heavy and meteorological temperature inversions are common. It also occurs elsewhere in varying degrees of severity and frequency. This pollution is customarily referred to as "smog," although it is not a mixture of smoke and fog for which that term was originally coined.

Visually, the smog does not resemble fog but is more like a heavy haze. It has a distinct odor and is irritating to mucous membranes, particularly of the eyes. It markedly reduces visibility, causes ozone formation and brings about serious damage to certain species of plants. It was once thought that the pollution was caused by smoke and fumes from industrial sources. Careful control of these sources, however, has produced little apparent improvement in smog conditions. It is now accepted that the principal source of smog is the exhaust gas from internal combustion engines and that smog is the product of sunlight-induced atmospheric reactions of organic compounds with oxides of nitrogen.

Estimates show that automobile exhaust provides 65 percent (900 tons/day) of the hydrocarbons and 60 percent [430 tons/day as nitrogen dioxide ($NO_2$) or 280 tons/day as nitric oxide (NO)] of the oxides of nitrogen found in the atmosphere in Los Angeles County.

The hydrocarbons in exhaust gases arise from the incomplete combustion of the fuel. The nitrogen oxides, which result from the fixation of nitrogen during combustion, are formed during all phases of operation in the internal combustion engine. Their concentration in the exhaust gases varies from 20 p.p.m. at idle motor conditions to 1000 p.p.m. during acceleration.

Most of the total oxides of nitrogen emitted are present as nitric oxide (NO) which is readily converted to nitrogen dioxide ($NO_2$) in the atmosphere. The dioxide absorbs ultraviolet radiation in sunlight and is thereby dissociated into a nitric oxide molecule and an oxygen atom. The oxygen atom enters into a host of chemical reactions with the organic constituents of exhaust gases, particularly the hydrocarbons. Furthermore, the photolysis of nitrogen dioxide ($NO_2$) appears to be important in ozone formation.

A substantial reduction of the oxides of nitrogen from automobile exhaust gases should minimize the undesirable properties of smog. Among the methods which have been suggested for their removal are: (a) the decomposition of nitric oxide on activated carbon, (b) the use of a maximum performance carburetor and (c) water injection. None of these methods, however, has been found practical and none has afforded a solution to the problem of removing nitrogen oxides from combustion gases.

It is accordingly an object of the present invention to provide a process for removing oxides of nitrogen from combustion gases containing the same. A further object is the provision of a method for removing oxides of nitrogen from the exhaust gas from an internal combustion engine. A still further object of the invention is to provide a method for substantially reducing smog formation by effecting removal of the oxides of nitrogen from exhaust gases of internal combustion engines.

The above and other objects which will be apparent to those skilled in the art are achieved in accordance with the process described herein.

In one embodiment, the present invention is concerned with a process for reducing the content of oxides of nitrogen in a combustion gas by bringing such gas into contact at a temperature between about 400° C. and about 600° C. with a crystalline alkali metal or alkaline earth metal aluminosilicate having rigid three dimensional networks made up of unit cells characterized by the substantial absence of change in unit cell dimensions upon dehydration and rehydration and pores of uniform dimensions distributed throughout the crystalline structure which material has been subjected to a thermal pretreatment in an inert atmosphere prior to said contact at a temperature within the approximate range of 400° to 550° C. for a period of between about 1 and about 10 hours.

In another embodiment of the invention there is provided a process for reducing the content of oxides of nitrogen in the exhaust gas from an internal combustion engine by bringing said gas into contact at a temperature between about 400° C. and about 600° C. with a crystalline sodium or calcium aluminosilicate having rigid three-dimensional networks made up of unit cells characterized by the substantial absence of change in unit cell dimensions upon dehydration and rehydration and a uniform effective pore diameter within the approximate range of 3 to 15 Angstrom units which aluminosilicate has been subjected to thermal pretreatment in an inert atmosphere prior to said contact at a temperature within the approximate range of 400 to 550° C. for a period of between about 1 and about 10 hours.

In still another embodiment of the invention there is provided a process for reducing the content of oxides of nitrogen in the exhaust gas from an internal combustion engine by bringing such gas into contact at a temperature between about 400° C. and about 600° C. with a crystalline sodium aluminosilicate having a uniform effective pore diameter within the approximate range of 8 to 13 Angstrom units which aluminosilicate has been subjected to thermal pretreatment in an inert atmosphere prior to said contact at a temperature within the approximate range of 400 to 550° C. for a period of between about 1 and about 10 hours.

The combustion gas undergoing treatment in accordance with the present process may suitably be any combustion gas containing a minor proportion of the oxides of nitrogen. Generally, the charge of combustion gas will contain principally hydrocarbons, carbon dioxide and water together with minor proportions of carbon monoxide and hydrogen as well as the minor proportions of nitrogen oxides. Thus, an analysis, on a water-free basis, of a typical combustion gas [1] undergoing treatment in accordance with the process described herein includes:

| Combustion gas component: | Parts per million |
|---|---|
| Oxides of nitrogen (as nitrogen dioxide) | $1000 \pm 100$ |
| Carbon monoxide | $20,000 \pm 1000$ |
| Carbon dioxide | $59,000 \pm 3000$ |
| Methane | $5100 \pm 500$ |
| Ethylene | $500 \pm 50$ |
| Acetylene | $330 \pm 50$ |
| Other higher hydrocarbons | $470 \pm 30$ |

As indicated hereinabove, it is particularly desired to treat the exhaust gas from an internal combustion engine.

---
[1] E. R. Stephens et al., Interim Tech. Rpt. No. I–A1845–1. The Franklin Institute.

Generally, such gas contains a content of oxides of nitrogen in the approximate range of 20 p.p.m. to 1000 p.p.m. Other components making up such exhaust gas include: hydrogen, nitrogen, carbon monoxide, carbon dioxide, water, low molecular weight hydrocarbons, unburned fuel components, non-volatile components and inorganic lead salts.

The treating agent with which the above-indicated gas charge is brought into contact, in accordance with the present invention, consists essentially of specified crystalline alkali or alkaline earth metal aluminosilicate salts. Such salts are essentially dehydrated forms of crystalline zeolites in which the atoms of alkali or alkaline earth metal, silicon, aluminum and oxygen are arranged in a definite and consistent crystalline pattern. The structure contains a large number of small cavities, interconnected by a number of still smaller channels. These cavities and channels are precisely uniform in size. Chemically, these zeolites may be represented by the general formula:

$$Me_{\frac{x}{n}}[(AlO_2)_x(SiO_2)_y] \cdot zH_2O$$

where Me is an alkali or alkaline earth metal cation, $x/n$ is the number of exchangeable metal cations of valence $n$, $x$ is also the number of aluminum ions combined in the form of aluminate, $y$ is the number of silicon atoms and $z$ is the number of water molecules, removal of which produces the characteristic channel system. In the above formula, the ratio $y/x$ is a number from 1 to 5. Zeolites having the above characteristics have sometimes been referred to as molecular sieves. At the present time, there are commercially available molecular sieves of the "A" series and of the "X" series. A synthetic zeolite known as "Molecular Sieve 4A" is a crystalline sodium aluminosilicate having an effective pore diameter of about 4 Angstroms. In the hydrated form, this material is chemically characterized by the formula:

$$Na_{12}(AlO_2)_{12}(SiO_2)_{12} \cdot 27H_2O$$

The synthetic zeolite known as "Molecular Sieve 5A" is a crystalline aluminosilicate salt having an effective pore diameter of about 5 Angstroms and in which a major proportion of the sodium ions in the immediately above formula is replaced by calcium, it being understood that calcium replaces sodium in the ratio of one calcium ion for two sodium ions. A crystalline sodium aluminosilicate is also available commercially under the name of "Molecular Sieve 13X." The letter "X" is used to distinguish the lattice structure of this zeolite from that of the "A" crystal mentioned above. As prepared, the 13X material contains water and has the unit cell formula $Na_{86}[(AlO_2)_{86}(SiO_2)_{106}] \cdot 267H_2O$. The synthetic zeolite known as "Molecular Sieve 10X" is a crystalline aluminosilicate salt in which a substantial proportion of the sodium ions of the 13X material have been replaced by calcium.

Molecular sieves of the "A" series consist fundamentally of a three-dimensional structure of oxygen ions arranged tetrahedrally about silicon and aluminum ions. Adjoining tetrahedra share oxygen ions in such a manner that the ratio of atoms of oxygen to the total number of atoms of aluminum and silicon is equal to two. The electrovalence of the tetrahedra containing aluminum is balanced by the inclusion in the crystal of a cation, for example, an alkali metal or an alkaline earth metal cation. This equilibrium can be expressed by formula wherein the ratio of $Al_2$ to the number of the various cations, such as Ca, Sr, $Na_2$, $K_2$ or $Li_2$ is equal to unity. One cation may be exchanged either in entirety or partially by another cation utilizing ion exchange techniques as discussed hereinbelow. The spaces between the tetrahedra are occupied by molecules of water prior to dehydration.

Molecular sieves are ordinarily prepared initially in the sodium form of the crystal. The sodium ions in such form may, as desired, be exchanged for other alkali or alkaline earth metal cations. In general, the process of preparation involves heating, in aqueous solution, an appropriate mixture of oxides, or of materials whose chemical composition can be completely represented as a mixture of oxides $Na_2O$, $Al_2O_3$, $SiO_2$ and $H_2O$ at a temperature of approximately 100° C. for periods of 15 minutes to 90 hours or more. The product which crystallizes within this hot mixture is separated therefrom and water washed until the water in equilibrium with the zeolite has a pH in the range of 9 to 12.

The empirical formula for the zeolites utilized herein can be expressed as:

$$\frac{M_2O}{n} \cdot Al_2O_3 \cdot XSiO_2 \cdot YH_2O$$

where M is an alkali or alkaline earth metal or combination thereof and $n$ is the balance of the metal. A specific crystalline zeolite has values of X and Y within a definite range. The value of X for any specific zeolite varies in a certain manner depending on whether aluminum or silicon atoms occupy equivalent positions in the lattice. For molecular sieves of the "A" series, X has an average value of 1.85±0.5. The value of Y, depending on the condition of hydration and on the metal cation present may vary from 6 to 0. The average value of Y for the completely hydrated sodium zeolite of the "A" series is 5.1. In the above general formula, the ratio of $Na_2O$ to $Al_2O_3$ is equal to 1. However, if during the process of preparation, excess of the base present in the mother liquor is not eliminated by washing of the crystalline precipitate, analysis will show a ratio slightly greater than 1. On the other hand, if the washing is excessive a certain amount of exchange of the sodium ions by hydrogen ions may occur, bringing the aforementioned ratio to slightly less than 1. The ratio of $$\frac{M_2O}{n} \text{ to } Al_2O_3$$

in the above general formula may accordingly be defined more accurately as being 1±0.2.

Suitable reagents in the preparation of the sodium zeolite of the "A" series include silica gel, silicic acid or sodium silicate as sources of silica. Alumina can be supplied by utilizing activated alumina, gamma alumina, alpha alumina, aluminum trihydrate or sodium aluminate. Sodium hydroxide is suitably used as the source of the sodium ion and, in addition, contributes to the regulation of the pH. All reagents are preferably soluble in water. The reaction solution has a composition, expressed as mixtures of oxides, within the ranges $SiO_2/Al_2O_3$ of 0.5 to 2.5, $Na_2O/SiO_2$ of 0.8 to 3.0 and $H_2O/Na_2O$ of 35 to 200. The reaction mixture is placed in a suitable vessel which is closed to the atmosphere in order to avoid losses of water and the reagents are then heated for an appropriate length of time. A convenient and generally employed process of preparation involves preparing an aqueous solution of sodium aluminate and sodium hydroxide and then adding with stirring an aqueous solution of sodium silicate. It is to be noted that the material first formed on mixing the above solutions is an amorphous precipitate generally inactive in the process of the invention. It is only after transformation of the amorphous precipitate to a crystalline form that the active material described herein is obtained. While satisfactory crystallization may be obtained at temperatures from 21° C. to 150° C., the pressure being atmospheric or greater, corresponding to the equilibrium of the vapor pressure with the mixture at the reaction temperature, crystallization is ordinarily carried out at about 100° C. For temperatures between room temperature (21° C.) and 150° C. an increase in temperature increases the velocity of the reaction and decreases its duration. As soon as the zeolite crystals are completely formed, they retain their structure and it is not essential to maintain the temperature of the reaction any longer in order to obtain a maximum yield of crystals.

After formation, the crystalline zeolite is separated from the mother liquor, usually by filtration. The crystalline mass is then washed, preferably with distilled water, and while on the filter, until the wash water, in equilibrium with the zeolite, reaches a pH of 9 to 12. The crystals are then dried at a temperature between 25° C. and 150° C. The resulting crystalline zeolite has rigid three-dimensional networks made up of unit cells characterized by the substantial absence of change in unit cell dimensions upon dehydration and rehydration. The dehydrated aluminosilicate employed in the process of the present invention is further necessarily characterized by pores of uniform dimensions distributed throughout the crystalline structure. In this regard, molecular sieves of calcium and/or sodium aluminosilicate which possess a uniform effective pore diameter within the approximate range of 3 to 15 and especially 8 to 13 Angstrom units have been found to be particularly applicable.

The sodium ions of the above zeolite may thus be replaced partially or completely by other alkali metal or alkaline earth metal cations. Replacement is suitably accomplished by contacting the crystalline sodium aluminosilicate zeolite with a solution of an ionizable compound of the alkali metal or alkaline earth metal ion which is to be zeolitically introduced into the molecular sieve structure for a sufficient time to bring about the extent of desired introduction of such ion. After such treatment, the resulting exchanged product is water-washed, dried, activated by heating to an elevated temperature, and thereafter is ready for use. The extent to which exchange takes place can be controlled. Thus, taking the exchange of sodium for calcium as a typical example, such exchange can be effected in a proportion of less than 5 percent up to 100 percent. One method of regulation of the degree of exchange consists of impregnating a known amount of the sodium zeolite with solutions containing determined amounts of exchangeable ions.

As noted hereinabove, there are numerous forms of zeolites of the "A" series having exchanged ions. While, generally, the substances containing a divalent alkaline earth metal have pore size characteristics analogous to those of calcium, the exact pore size will differ. Such property can be advantageously employed in the process of the present invention in affording control of pore size by suitable selection of a particular cation. Similarly, the substances having a monovalent alkali metal ion have pore size characteristics similar to the sodium zeolite of such series, but the precise pore size is subject to similar control and selection.

Molecular sieves of the "X" series are characterized by the formula:

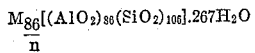

where M is $Na^+$ or $Ca^{++}$ or other alkali metal or alkaline earth metal ions introduced by replacement thereof and $n$ is the valence of the cation M. The structure consists of a complex assembly of 192 tetraheda in a large cubic unit cell 24.95 A. on an edge. The adsorption volume is about 0.35 cc./gram of dehydrated zeolite.

For molecular sieves of this series, in the empirical formula:

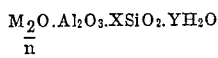

X has an average value of 2.5±0.5. The value of Y, depending on the condition of hydration and on the metal cation present may vary from 8 to 0. The average value of Y for the completely hydrated sodium zeolite of the "X" series is 6.2.

Molecular sieves of the "X" series are prepared in a manner similar to that described hereinabove for preparation of molecular sieves of the "A" series. However, for synthesis of the "X" series molecular sieves, the reaction mixture has a composition, expressed as mixtures of oxides, within the following limits: $Si_2/Al_2O_3$ of 3 to 5, $Na_2O/SiO_2$ of 1.2 to 1.5 and $H_2O/Na_2O$ of 35 to 60.

The crystalline aluminosilicate employed herein is preferably used in the form of small fragments in a size best suited for operation under the specific conditions existing. Thus, the aluminosilicate may be in the form of a powder or, preferably, in the form of granules, pellets or spheres. Pellets, 1/16" to 1/8" size, for example, may be obtained upon pelleting the crystalline aluminosilicate with a suitable binder such as clay. The commercially available material described hereinabove may be obtained upon a clay-free basis or in the form of pellets in which clay is present as a binder.

It has been found essential to the success of the present process that the crystalline aluminosilicate before contacting with the combustion gas be subjected to a thermal pretreatment in an inert atmosphere at a temperature within the approximate range of 400 to 550° C. for a period of between about 1 and about 10 hours. The inert atmosphere in which thermal pretreatment is effected is suitably nitrogen but may include other inert gases such as for example, helium, argon, and the like. Excellent results have been obtained by pretreating the crystalline aluminosilicate in a nitrogen atmosphere at a temperature of about 400° C. for a period of about 2 hours.

It has been found, in accordance with the present invention, that the content of oxides of nitrogen in a combustion gas may be effectively reduced by bringing the same into contact under elevated temperature conditions with the thermally pretreated crystalline aluminosilicate. It is a critical condition of the present process that the temperature at which the combustion gas charge is contacted with the crystalline aluminosilicate be at least about 400° C. and generally within the approximate range of 400° C. to 600° C. The process may be carried out on a batch basis. However, it is contemplated that the process will generally be conducted in a continuous manner by passing the charge of combustion gas over the thermally pretreated crystalline aluminosilicate until the content of nitrogen oxides of the combustion gas is reduced to a predetermined minimum. It will be, of course, understood that the amount of thermally pretreated crystalline aluminosilicate to be used in any operation will depend upon the total volume of gases per unit time from which it is desired to remove the oxides of nitrogen.

The following examples will serve to illustrate the method of the invention without limiting the same.

EXAMPLE 1

Three pounds of 13X molecular sieve in the form of 1/16 inch pellets were thermally treated at 400° C. for 2 hours in an atmosphere of nitrogen.

The thermally treated material was then utilized for removing nitrogen oxide from the exhaust gas from a CLR test engine of the type described in report by Coordinating Research Council-Project No. CM-20-58 "Development of Research Technique for Study of the Oxidation Characteristics of Crankcase Oils in the CLR Oil Test Engine," March 1959. Such exhaust gas initially contained 0.55 mg. NO/liter. The reaction temperature was 420° C. The exhaust gas charge was passed over the thermally treated solid at a space velocity of 520 liters of gas at reactor conditions per liter of solid per minute.

A sample of effluent gas was collected after the thermally treated crystalline aluminosilicate had been in contact with the exhaust gases for three hours. The collected sample was found to have a reduced nitrogen oxide content of 0.13 mg. NO per liter.

EXAMPLE 2

Fifty grams of 13X molecular sieve thermally pretreated for 2 hours at 400° C. in nitrogen were used for removing nitrogen oxide from the combustion gas of a laboratory burner containing 0.88 mg. NO/liter. The reaction temperature was 400° C. and the combustion gas charge was passed over the thermally treated material at a space velocity of 50 cc. of gas at reactor conditions per cc. of crystalline aluminosilicate per minute. The effluent gas after undergoing treatment for 1 hour was found to have a nitrogen oxide content of less than 0.02 mg. NO per liter.

EXAMPLE 3

This example will serve to illustrate the importance of control of reaction temperature in effecting the desired removal of nitrogen oxide.

Fifty grams of a thermally pretreated 13X molecular sieve such as employed in Example 2 were used for removing nitrogen oxide from the combustion gas of a laboratory burner containing 0.85 mg. NO/liter. The reaction temperature in this instance was 200° C. The effluent gas after undergoing treatment for 1 hour had a nitrogen oxide content of 0.74 mg. NO per liter showing that at 200° C., the thermally pretreated crystalline aluminosilicate had little effect in accomplishing the desired removal of nitrogen oxide.

EXAMPLE 4

This example will serve to illustrate the importance of thermal pretreatment of the crystalline aluminosilicate employed.

Fifty grams of 13X molecular sieve, which had not undergone thermal pretreatment, were contacted with the combustion gas of a laboratory burner containing 0.86 mg. NO/liter. The reaction temperature was 400° C. and the combustion gas charge was passed over the sieve material at a space velocity of 50 cc. of gas per cc. of sieve per minute. The effluent gas, after undergoing treatment for 1 hour, had a nitrogen oxide content of 0.79 mg. NO/liter, establishing that a crystalline aluminosilicate sieve which had not been subjected to the thermal pretreatment specified herein had little effect in accomplishing the desired removal of nitrogen oxide.

The results of the foregoing examples are set forth in Table I below:

*Table I*

| Example | Pretreatment | Reactant Temp., °C. | Mg. NO/liter | |
|---|---|---|---|---|
| | | | Start | Finish |
| 1 | 2 hrs. at 400° C. in $N_2$ | 420 | 0.55 | 0.13 |
| 2 | do | 400 | 0.88 | 0.02 |
| 3 | do | 200 | 0.85 | 0.74 |
| 4 | None | 400 | 0.86 | 0.79 |

It will be evident from the foregoing data that the alkali metal and alkaline earth metal aluminosilicate salts which have undergone the specified thermal pretreatment are applicable, under elevated temperature conditions, for effectively reducing the content of oxides of nitrogen in a combustion gas and, specifically, in the exhaust gas from an internal combustion engine. Accordingly, it is to be understod that the above description is merely illustrative of preferred embodiments of the invention of which many variations may be made within the scope of the following claims by those skilled in the art without departing from the spirit thereof.

I claim:
1. A process for reducing the content of oxides of nitrogen in a combustion gas containing the same which comprises bringing said gas into contact at a temperature between about 400° C. and about 600° C. with a material selected from crystalline alkali metal and alkaline earth metal aluminosilicates having rigid three-dimensional networks made up of unit cells characterized by the substantial absence of change in unit cell dimensions upon dehydration and rehydration and pores of uniform dimensions distributed throughout the crystalline structure, which material has been subjected to thermal pretreatment in an inert atmosphere prior to said contact at a temperature within the approximate range of 400 to 550° C. for a period of between about 1 and about 10 hours.

2. A process for reducing the content of oxides of nitrogen in the exhaust gas from an internal combustion engine which comprises bringing said gas into contact at a temperature between about 400° C. and about 600° C. with a material selected from the group consisting of a crystalline sodium aluminosilicate and a crystalline calcium aluminosilicate, having rigid three dimensional networks made up of unit cells characterized by the substantial absence of change in unit cell dimensions upon dehydration and rehydration and a uniform effective pore diameter within the approximate range of 3 to 15 Angstrom units, which material has been subjected to thermal pretreatment in an inert atmosphere prior to said contact at a temperature within the approximate range of 400 to 550° C. for a period of between about 1 and about 10 hours.

3. A process for reducing the content of oxides of nitrogen in a combustion gas containing the same, which comprises bringing said gas into contact at a temperature between about 400° C. and about 600° C. with a crystalline alkali metal aluminosilicate having rigid three-dimensional networks made up of unit cells characterized by the substantial absence of change in unit cell dimensions upon dehydration and rehydration and a uniform effective pore diameter within the approximate range of 8 to 13 Angstrom units, which aluminosilicate has been subjected to thermal pretreatment in an inert atmosphere prior to said contact at a temperature within the approximate range of 400 to 550° C. for a period of between about 1 and about 10 hours.

4. A process for reducing the content of oxides of nitrogen in the exhaust gas from an internal combustion engine which comprises bringing said gas into contact at a temperature between about 400° C. and about 600° C. with a crystalline sodium aluminosilicate having rigid three-dimensional networks made up of unit cells characterized by the substantial absence of change in unit cell dimensions upon dehydration and rehydration and a uniform effective pore diameter within the approximate range of 8 to 13 Angstrom units, which aluminosilicate has been subjected to thermal pretreatment in a nitrogen atmosphere prior to said contact at a temperature within the approximate range of 400 to 550° C. for a period of between about 1 and about 10 hours.

5. A process for reducing the content of oxides of nitrogen in the exhaust gas from an internal combustion engine which comprises bringing said gas into contact at a temperature between about 400° C. and about 600° C. with a crystalline sodium aluminosilicate having rigid three dimensional networks made up of unit cells characterized by the substantial absence of change in unit cell dimensions upon dehydration and rehydration and a uniform effective pore diameter within the approximate range of 8 to 13 Angstrom units, which aluminosilicate has been subjected to thermal pretreatment in a nitrogen atmosphere prior to said contact at a temperature of about 400° C. for a period of about 2 hours.

(References on following page)

References Cited in the file of this patent

"Separation of Mixtures Using Zeolites As Molecular Sieves, part I. Three classes of Molecular-Sieve Zeolite," by R. M. Barrer, J. Soc. Chem. Ind., vol. 64, May 1945, pages 130 and 131.

"Molecular-Sieve Action of Solids" by R. M. Barrer, Quarterly Review, Chemical Society, London, 1949, pages 293 to 320.

"Examine These Ways To Use Selective Adsorption," Petroleum Refiner, vol. 36, No. 7, July 1957, pages 136–140.